United States Patent [19]

Schneider

[11] 4,141,589
[45] Feb. 27, 1979

[54] HEADREST FOR SEAT OF VEHICLE

[76] Inventor: Jean C. Schneider, Plaisance 2, La Chaux-de-Fonds, Switzerland, 2300

[21] Appl. No.: 864,827

[22] Filed: Dec. 27, 1977

Related U.S. Application Data

[63] Continuation of Ser. No. 708,864, Jul. 26, 1976.

[51] Int. Cl.$^2$ ............................................. A47C 1/10
[52] U.S. Cl. ................................... 297/397; 297/216; 297/396
[58] Field of Search ............... 297/216, 390, 391, 396, 297/397, 404; 280/749

[56] References Cited

U.S. PATENT DOCUMENTS

| 2,757,040 | 7/1956 | McLelland | 280/749 X |
| 3,645,556 | 2/1972 | Kabori | 280/749 |
| 3,865,450 | 2/1975 | Bruenig | 297/397 |

FOREIGN PATENT DOCUMENTS

| 1958060 | 5/1971 | Fed. Rep. of Germany | 297/396 |
| 2201537 | 7/1973 | Fed. Rep. of Germany | 297/396 |
| 2206094 | 8/1973 | Fed. Rep. of Germany | 297/396 |

Primary Examiner—James C. Mitchell
Attorney, Agent, or Firm—Miller & Prestia

[57] ABSTRACT

A seat headrest for a vehicle includes a reinforcement means in communication with an energy shock absorbing means. the reinforcement means include a plurality of hollow segments. The segments of the reinforcement means cooperate with the energy absorbing means in the absorbtion of shock to the headrest. In vehicles, particularly in cars, headrest are absolutely necessary to protect the passengers on the front seats against getting hurt at the spine or at the neck which are frequent consequences of accidents.

8 Claims, 2 Drawing Figures

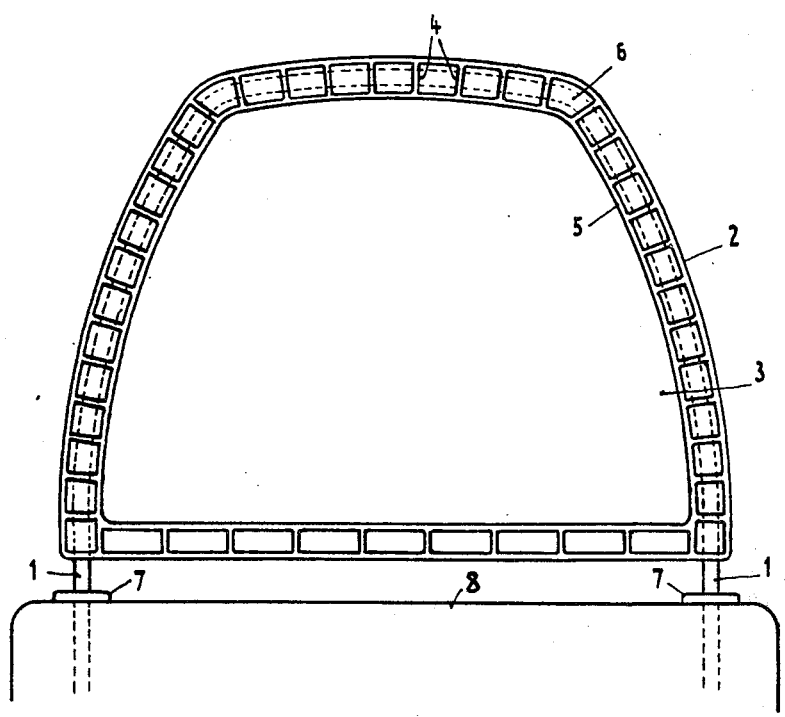
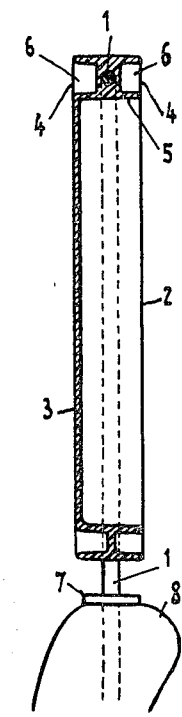
FIG.1.
FIG.2

HEADREST FOR SEAT OF VEHICLE

This is a continuation of application Ser. No. 708,864, filed July 26, 1976.

There exist different types of headrests for seats of vehicles and particularly for cars. Nevertheless these headrests usually are large in size and therefore reduce the free view inside of the vehicle and from the inside to the outside of the vehicle. Others which are smaller in size need to be adjusted to fit for passengers of different tallness. There are also headrests which present openings in the center in order to increase the visibility, which aim however they don't reach satisfactorily.

Apart from these well-known headrests, which are frequently used, there are others which present nets stretched over rigid frames, as they are for instance described in the U.S. Pat. No. 3,645,556 and in the published German Patent Applications DT-OS No. 2 042 069 and 2 206 094. Nevertheless this kind of headrests is not very aesthetical and does not meet all safety requirements. Moverover they also reduce the visibility inside and from the inside to the outside of the vehicle. Other types of safety installations, known for instance from the French Pat. No. 2.065.395 and the published German Patent Application DT-OS No. 2 056 801 and serving as headrests, are mainly made of transparent material. These known devices nevertheless present the great disadvantage of having to be fixed between the back of either the front seat or the back seat and the top of the vehicle, which requires a special construction of the car body and does not make them very handy.

One of the objects of the present invention is to propose a headrest which presents on the one hand dimensions assuring a good function without adjustments, whatever the size of the user of the vehicle may be, even if he is not perfectly centered on the seat and which, on the other hand, only slightly reduces the visibility inside and to the outside of the vehicle, as well as for the driver as for the other passengers. Another object of the present invention is that the headrest according to the present invention has to meet the safety requirements prescribed by the different competent national administrations.

According to the invention these and other objects are met by a headrest which comprises a frame having a structure for absorbing energy in case of a collision between the head and the headrest and a transparent and elastic foil which proceeds above the frame and forms, together with it, a reinforcement assuring the fixation of the foil on the frame.

An advantageous embodiment of the invention is characterized in the reinforcement being formed by segments, the walls of which present nearly the same thickness as the foil.

In the following, one realisation of the invention is described by way of exammple, without limiting the invention to that embodiment. It will be understood more easily by means of the drawings in which FIG. 1 is a rear view of said embodiment and FIG. 2 is a sectional view of the embodiment according to FIG. 1 along its middle axis.

The drawing illustrates a very simple embodiment of a headrest according to the invention which is formed of a metallic frame 1 of circular section serving on the one hand as support for a foil 3 of transparent and elastic injected synthetic material of a soft PVC type. The foil 3 serves as a rest for the head in case of a shock. On the other hand said frame 1 is a support of a reinforcement 4 which completely covers the frame 1 and presents a thickness which is sufficient to absorb the shocks and serves to hold the foil 3 on its whole circumference.

The reinforcement 4 is formed of segments 6 which present walls 5 having a thickness approximately similar to that of the foil 3 and are injectable and have a sufficient rigidity to meet the safety requirements.

The metallic frame 1 is made of a steel bar adequately bent and fitting with its ends into openings of conventional mountings 7 which are parts of the seat 8.

This embodiment of the object of the invention allows to fulfil both, the requirements relative to the necessary protection of the frame 1 and the requirements relative to a manufacturing by injection of a perfectly transparent foil, both in a single manufacturing process with only one material.

Referring to FIGS. 1 and 2, the segments of the reinforcement 4, are typically hollow and rectangular in shape. Furthermore, as is most evident from FIG. 2, because the foil 3 is directly attached to a wall 5 of the reinforcement 4, the foil 3 and wall 5 of the segments will cooperate together in the absorbtion of a shock to the headrest unit, and in particular a shock to the foil 3. That is to say, a shock that is subjected to the foil 3 will in turn apply a force to the walls 5 which will in turn be deflected somewhat and thereupon cooperate in absorbing the shock along with foil 3.

The headrest 2 according to the invention is at least approximately placed in the prolongation of the back of the seat 8 in a length which is sufficient to fit for all passengers having a height adapted to the vehicle, so that they can rest their head on the headrest without having to adjust its position.

In another embodiment of the invention, the reinforcement 4 can be made in a material different from that of the foil 3 and in a separate production step.

The metallic frame 1 can be replaced by a frame made of synthetic material of high mechanical resistance, as, for instance, a synthetic charged with glass-fiber.

The foil 3 which is flat in the hereinbefore described embodiment, can be curved to adapt itself better to the form of the back of the seat 8. Nevertheless, due to the fact that the lower part of the reinforcement 4 in the embodiment described does not comprise a metallic bar assures that the passenger can easily adapted its form to the one of the back of the seat 8 by slightly pushing against it with his back.

The metallic frame 1 can, in another embodiment, comprise adequately bent extremities fitting directly into holes of the back of the seat provided for this purpose. It can also be fixed to other fixation elements presenting no holes.

In another embodiment of the invention, the foil 3 and the reinforcement 4 can be replaced by a cover made for instance of a transparent soft PVC adjusted over the metallic frame 1 and serving as the active part of the head rest. This cover can be formed of a plate which is adequately bent to cover on the one hand the front side and on the other hand the back side of the frame 1. The edges of the cover are, outside of the frame, fixed together on three sides, either by an adhesive tape, or by soldering or simply by sticking, so that two openings remain, through which the frame 1 can be mounted and demounted. The edges of the cover are formed in order to prevent both driver and passengers from being hurt in case of a collision.

I claim:

1. In an auto seat headrest unit of the type having a frame with a pair of spaced leg portions adapted for attachment to the seat and energy absorbing means spanning the frame for absorbing energy, the improvement comprising reinforcement means surrounding the frame connecting said energy absorbing means to the frame, said reinforcement means having a plurality of segments, each said segment having a thickness sufficient to absorb shocks in the area of said frame, and said segments cooperating with said energy absorbing means in the absorption of a shock to said headrest unit.

2. The head rest as recited in claim 1, wherein said energy absorbing means is the same thickness as said reinforcement means.

3. Headrest according to claim 1 in which the energy absorbing means is placed at least approximately in the prolongation of the back of the seat over a length so as to permit passengers of the vehicle, independently of their height to rest their heads on the headrest without having to adjust it.

4. Headrest according to claim 1, in which the energy absorbing means and the reinforcement means are made of one piece of transparent and elastic material.

5. The headrest in accordance with claim 1 wherein said segments are hollow and rectangular in shape.

6. Headrest according to claim 1 in which the frame is exclusively formed out of elements with rounded sections so as to prevent said energy absorbing means and said reinforcement means from being torn or the passengers from being hurt.

7. Headrest according to claim 1 in which the frame is formed of a round bar of steel, bent in order to permit its fixation on the seat.

8. Headrest according to claim 1, in which the frame is made of a hard injected synthetic material presenting a high mechanical resistance.

* * * * *